United States Patent
Cavagna

(10) Patent No.: US 8,282,134 B2
(45) Date of Patent: Oct. 9, 2012

(54) METHOD AND APPARATUS FOR ASSEMBLING PRESSURE REDUCING FUEL REGULATOR

(75) Inventor: Savio Cavagna, Brescia (IT)

(73) Assignee: Cavagna Group, Brescia (IT)

( * ) Notice: Subject to any disclaimer, the term of this patent is extended or adjusted under 35 U.S.C. 154(b) by 817 days.

(21) Appl. No.: 12/466,715

(22) Filed: May 15, 2009

(65) Prior Publication Data

US 2010/0289258 A1    Nov. 18, 2010

(51) Int. Cl.
F16L 39/00 (2006.01)
(52) U.S. Cl. ........... 285/1; 137/75; 137/78.4; 137/79; 137/72; 251/149.4; 285/319; 126/25 R
(58) Field of Classification Search .......... 137/72, 137/75, 79, 78.4, 515; 251/149.4; 285/1, 285/2, 4, 319; 126/25 R
See application file for complete search history.

(56) References Cited

U.S. PATENT DOCUMENTS

| | | | |
|---|---|---|---|
| 114,511 A | 5/1871 | Alford | |
| 848,169 A | 3/1907 | Hawley | |
| 3,712,583 A * | 1/1973 | Martindale et al. | 251/149.4 |
| 3,826,523 A * | 7/1974 | Eschbaugh | 285/39 |
| 3,847,421 A * | 11/1974 | Eschbaugh et al. | 285/353 |
| 4,105,226 A * | 8/1978 | Frey et al. | 285/148.21 |
| 4,135,745 A * | 1/1979 | Dehar | 285/319 |
| 4,280,523 A | 7/1981 | Norton | |
| 4,610,468 A * | 9/1986 | Wood | 285/81 |
| 4,749,214 A * | 6/1988 | Hoskins et al. | 285/4 |
| 4,911,194 A | 3/1990 | Lechner | |
| 4,979,765 A * | 12/1990 | Bartholomew | 285/93 |
| 5,067,754 A * | 11/1991 | Bartholomew | 285/319 |
| 5,112,084 A * | 5/1992 | Washizu | 285/24 |
| 5,163,720 A * | 11/1992 | Abe | 285/319 |
| 5,330,155 A * | 7/1994 | Lechner | 251/149.6 |
| 5,367,548 A * | 11/1994 | Attix | 376/446 |
| 5,372,391 A * | 12/1994 | Bast et al. | 285/319 |
| 5,524,664 A * | 6/1996 | Lin | 137/75 |
| 5,582,201 A * | 12/1996 | Lee et al. | 137/454.2 |
| 5,979,867 A | 11/1999 | Ortiz Godinez | |
| 6,155,285 A * | 12/2000 | Hsiao | 137/75 |
| 6,250,692 B1 * | 6/2001 | Ito et al. | 285/319 |
| 6,688,323 B1 * | 2/2004 | Bartos et al. | 137/73 |
| 6,722,701 B1 * | 4/2004 | Godinez | 285/1 |
| 6,895,952 B1 * | 5/2005 | Bachelder | 126/25 R |
| 6,968,857 B2 | 11/2005 | Hawkins et al. | |
| 2002/0024217 A1 | 2/2002 | Mummert | |

* cited by examiner

Primary Examiner — John Rivell
Assistant Examiner — Minh Le
(74) Attorney, Agent, or Firm — Fay Sharpe LLP

(57) ABSTRACT

An apparatus and method of assembling a thermally responsive fluid coupling of a pressure reducing fuel regulator is provided. The fuel regulator includes an inlet conduit having a longitudinally extending ridge. A generally annular bushing is positioned over the inlet conduit. The bushing includes a plurality of circumferentially spaced figures and a cutout dimensioned to receive the ridge of the inlet conduit. A fluid-carrying member is positioned at least partially within the inlet conduit. A collar is positioned over the inlet conduit. The collar includes a first end adapted to be releasably connected to a cooperative fluid coupling and a second end. The second end of the collar is secured between the plurality of fingers of the bushing and the inlet conduit for preventing axial movement between the collar and the fluid-carrying member.

20 Claims, 4 Drawing Sheets

METHOD AND APPARATUS FOR ASSEMBLING PRESSURE REDUCING FUEL REGULATOR

BACKGROUND

The present disclosure relates generally to coupling devices for connecting two fluid-carrying conduits in end-to-end relation, as between a fluid source and fluid-utilizing device. More particularly, the present disclosure relates to a thermally sensitive fluid coupling for automatic disconnection in the event the coupling is exposed to temperatures above a predetermined temperature.

Thermally sensitive couplings are often used to releasably join fluid-carrying conduits, such as gas lines or the like. These quick-disconnect couplings are typically designed with a heat sensitive element that allows the coupled sections of the gas lines to disconnect automatically when the coupling is exposed to temperatures above a predetermined temperature. Disconnection of the fluid-carrying conduits triggers an interruption in the fluid flow path. The interruption of the fluid flow path halts the flow of flammable material (for example, natural or liquefied petroleum (LP) gas) to the heat source.

On type of fluid coupling includes a threaded connecting sleeve, which has a heat sensitive portion at one end and normally functions to connect the components of the fluid delivery system. A limitation of such a design is that the plastic used for the rotatable sleeve can have a sensitivity to certain commonly used cleaning chemicals and/or other agents which may be used to detect gas leakage. In addition, this type of coupling is rendered totally unusable when it thermally releases, because the heat sensitive portion is integrated with the connecting sleeve itself.

Another type of fluid coupling comprises a plug body which is held in a socket chamber by an annular collar. In turn, the collar is held on the plug body by a separate annular ring of fusible material which, when exposed to a predetermined excessive temperature, releases the plug body to shut off fluid communication in the fluid delivery system. Although such two-piece systems can be desirable because they are versatile, the construction of some of these systems is such that the independent fusible element often is not strong enough to counter the spring force exerted thereon even at normal temperatures, and thus may not prevent axial movement of the plug body over time. Further, such a coupling is often not adapted for ready assembly.

Accordingly, there is a need for a thermally responsive fluid coupling which incorporates an independent component that is sensitive to heat, adapted to retain a conventional fluid-carrying section without modification of the coupling components, and may be readily assembled.

BRIEF DESCRIPTION

According to one aspect, a thermally responsive fluid coupling for connecting a fluid conduit to an inlet conduit of a fuel regulator is provided. The inlet conduit defines a longitudinal axis and has an outer surface including an axially extending ridge. The fluid coupling comprises a fluid-carrying member, a collar and a bushing disposed between the fluid-carrying member and the collar. The fluid-carrying member has an inlet end for receiving fluid from the fluid conduit and an outlet end for delivering fluid to the inlet conduit. The collar is disposed around the fluid-carrying member. The collar has a first end adapted to be releasably connected to the fluid conduit, and a second end adapted to engage the outer surface of the inlet conduit. The bushing includes a first end, a second end, and a central bore extending axially from the first end to the second end. The first end is engaged by the fluid-carrying member and the second end is configured to engage the ridge of the inlet conduit for preventing rotation of the bushing in relation thereto. The bushing includes an outwardly extending, resilient thermally responsive protrusion which is configured to engage the collar for retaining the collar in place with respect to the inlet conduit while permitting rotational movement of the collar relative to the bushing. The protrusion is yieldable in response to a predetermined temperature to permit at least limited axial movement between the collar and the fluid-carrying member to shut off the fluid connection between the fluid-carrying member and the fluid conduit.

According to another aspect, a method of assembling a thermally responsive fluid coupling of a pressure reducing fuel regulator is provided. The fuel regulator includes an inlet conduit having a longitudinally extending ridge. A generally annular bushing is positioned over the inlet conduit. The bushing includes a plurality of circumferentially spaced figures and a cutout dimensioned to receive the ridge of the inlet conduit. A fluid-carrying member is positioned at least partially within the inlet conduit. A collar is positioned over the inlet conduit. The collar includes a first end adapted to be releasably connected to a cooperative fluid coupling and a second end. The second end of the collar is secured between the plurality of fingers of the bushing and the inlet conduit for preventing axial movement between the collar and the fluid-carrying member.

According to yet another aspect, a method of assembling a thermally responsive fluid coupling of a pressure reducing fuel regulator is provided. The fuel regulator includes an inlet conduit having an axially extending ridge. A generally annular bushing is slid over the inlet conduit. The bushing includes a first end, a second end, a plurality of circumferentially spaced fingers located between the first and second ends and a cutout dimensioned to receive the ridge of the inlet conduit. A fluid-carrying member is attached to the inlet conduit. A portion of the fluid-carrying member is at least partially received within the inlet conduit. The fluid-carrying member includes a wall for preventing axial movement of the bushing on the inlet conduit. A collar is slid over both the bushing and the inlet conduit. The collar includes a first end adapted to be releasably connected to a cooperative fluid coupling and a second end. The second end of the collar is secured between the plurality of fingers of the bushing and the inlet conduit for preventing axial movement between the collar and the fluid-carrying member. An inner surface of the collar second end engages both the bushing and the fluid conduit.

DETAILED DESCRIPTION

Figure 1:
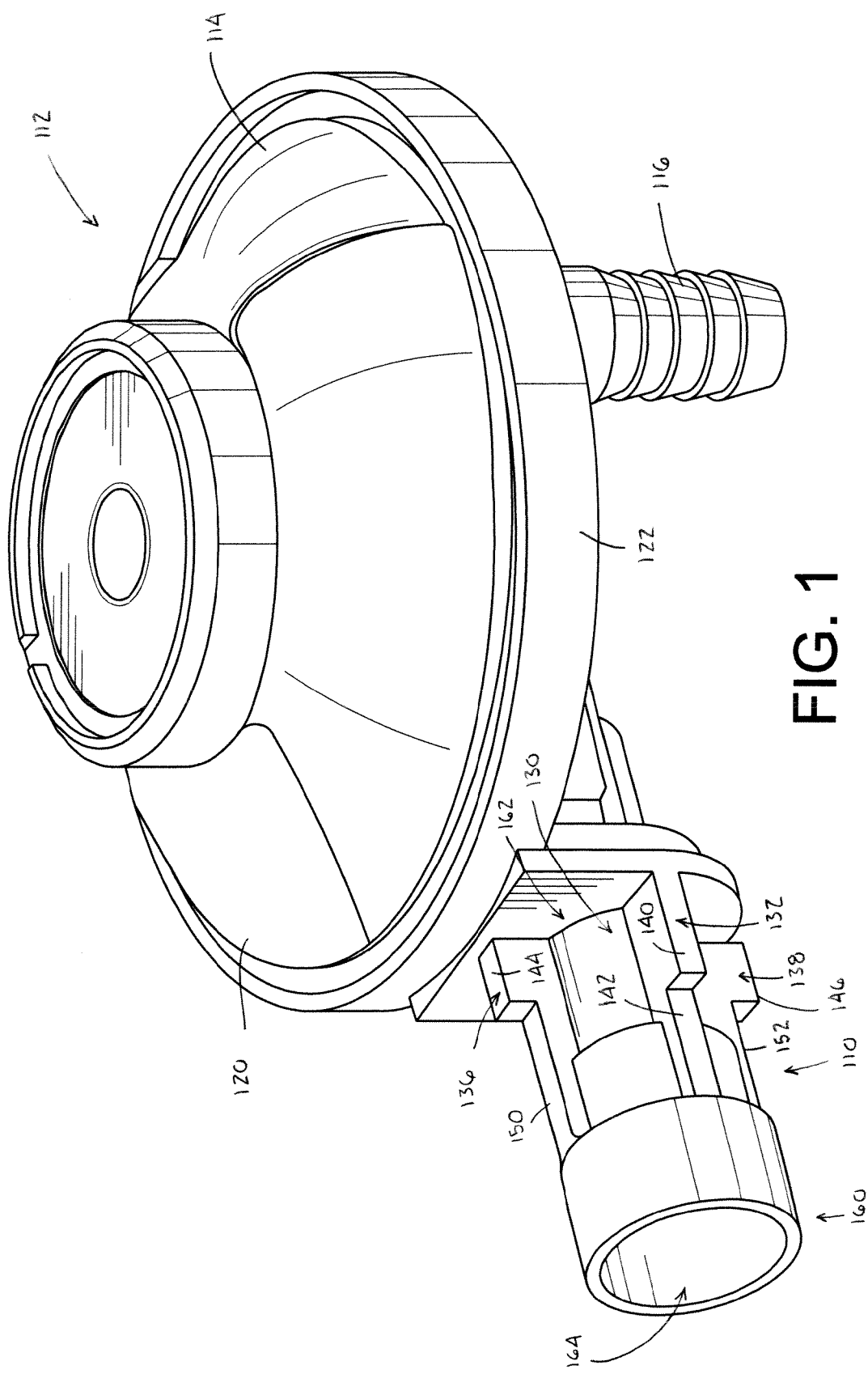
FIG. 1 is a perspective view of a pressure reducing fuel regulator.

It should, of course, be understood that the description and drawings herein are merely illustrative and that various modifications and changes can be made in the structures disclosed without departing from the present disclosure. It will also be appreciated that the various identified components of the fluid coupling disclosed herein are merely terms of art that may vary from one manufacturer to another and should not be deemed to limit the present disclosure. All references to direction and position, unless otherwise indicated, refer to the orientation of the fluid coupling illustrated in the drawings and should not be construed as limiting the claims appended hereto. Like numerals refer to like parts throughout the several views.

Figure 4:
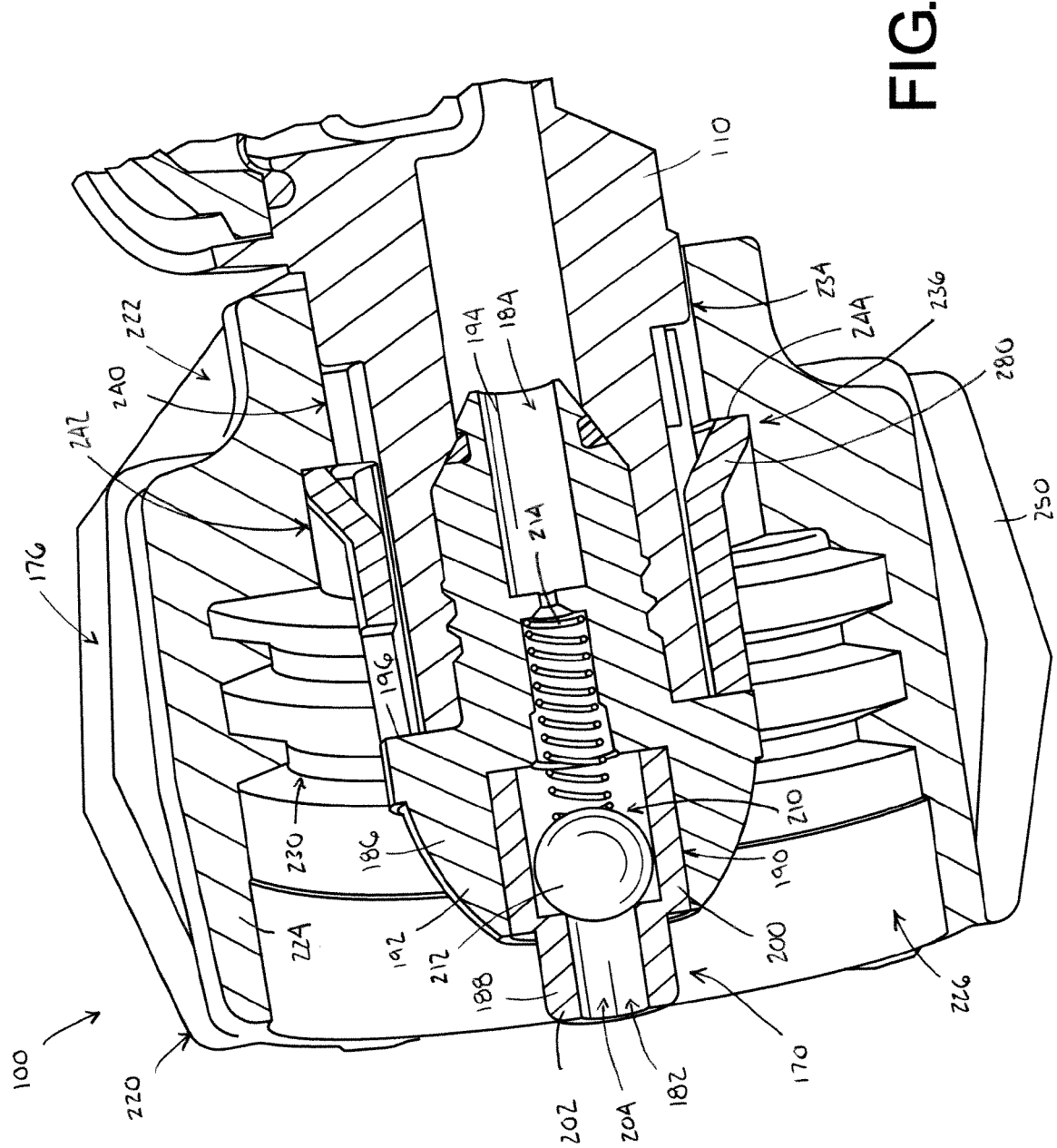
FIG. 4 is an enlarged cross-sectional view of the inlet conduit of FIG. 3 which further has mounted thereto a collar disposed about the inlet conduit.

Referring now to the drawings wherein the showings are for purposes of illustrating one or more embodiments only and not for purposes of limiting the same, FIG. 4 illustrates a thermally responsive fluid coupling 100 for connecting a fluid conduit (not shown) to an inlet conduit 110 of a pressure reducing fuel regulator 112 (FIG. 1). As is well known, the pressure reducing fuel regulator is configured to reduce and control the pressure of a fluid, such a natural or liquefied petroleum (LP) gas. In general, and with reference now to FIG. 1, the pressure reducing fuel regulator 112 varies the restriction through a valve (not shown) located in a housing 114 that is serially imposed in the fluid flow path. In this manner, the fuel regulator 112 can control the fluid flow rate and/or pressure provided at a downstream outlet 116 of the fuel regulator. As shown, the fuel regulator 112 includes the inlet conduit 110 at which a relatively high pressure fluid is presented and the fluid outlet 116 to which the fluid regulator provides the fluid at a lower regulated pressure. The housing 114 includes an upper housing portion 120 and a lower housing portion 122.

As shown in FIG. 1, the inlet conduit 110 of the fuel regulator 112 defines a longitudinal axis and has an outer surface 130. Located on the outer surface 130 are a pair of diametrically opposed first axially extending flanges (only first flange 132 is visible) and a pair of diametrically opposed second axially extending flanges 136 and 138. Each first flange has a length greater than a length of each second flange, which is circumferentially spaced from the first flanges. Each first flange 132 has a stepped configuration and includes a first section 140 and a second section 142, the first section being elevated relative to the second section. Similarly, each second flange 136, 138 has a stepped configuration including an elevated first section 144, 146 and a second section 150, 152. The inlet conduit 110 further includes a first end 160, a second end 162 and an opening or bore 164 extending axially from the first end to the second end.

With particular reference to FIG. 4, the fluid coupling generally comprises a fluid-carrying member 170, a collar 176 disposed around the fluid-carrying member 170, and a bushing 180 received on the inlet conduit 110 of the fuel regulator 112 and disposed between the fluid-carrying member 170 and the collar 176. The fluid-carrying member 170 has an inlet end 182 for receiving fluid from the fluid conduit (not shown) and an outlet end 184 for delivering fluid to the inlet conduit 110. The fluid-carrying member is at least partially received within the opening 164 of the inlet conduit 110 (FIG. 1). In the depicted embodiment, the fluid-carrying member includes a first element 186 and a second element 188 joined to the first element. More specifically, the second element 188 is at least partially housed within an opening 190 which extends axially through the first element 186. The first element 186 includes a collar portion 192 and a stem portion 194 projecting from the collar portion. The stem portion is fixedly secured within the opening 164 of the inlet conduit 110 by, for example, crimping. However, alternative manners for securing the fluid-carrying member 170 to the fluid conduit 110 are also contemplated. The collar portion 192 has a dimension greater than a dimension of the inlet conduit 110 such that a wall 196 of the collar portion extends radially above the outer surface 130 of the inlet conduit 110.

The second element 188 of the fluid-carrying member 170 includes an enlarged first section 200 and a reduced diameter second section 202. The first section 200 is received in the opening 190 of the first element 186. The second section 202 projects outwardly from the collar portion 192 of the first element 186. An axially oriented bore 204 extends between the first section 200 and the second section 202. As shown, a diameter of the bore 204 through the first section 200 is greater than is a diameter of the bore through the second section 202.

The fluid-carrying member 170 also incorporates an internal shutoff valve 210 in the form of a ball check valve. The valve 210 includes a ball member 212 and a biasing member 214, which can be in the form of a spring. The ball member 212 is positioned within the bore 204 of the second element 188. The ball member has a dimension greater than the diameter of the bore of the second section 202 and is axially displaceable within the bore of the first section 200 to selectively close the inlet end 182 of the fluid-carrying member 170. The bias member 214 urges the ball member 212 towards the second section 202 to selectively prevent the flow of fluid through the fluid-carrying member 170 and into the inlet conduit 110.

With continued reference to FIG. 4, the collar 176 is disposed about the fluid-carrying member 170. The collar has a first end 220 adapted to be releasably connected to a cooperative coupling member (not shown) connected to the fluid conduit (not shown) and a second end 222 adapted to engage bushing 180 (FIG. 3) and the outer surface 130 (FIG. 1) of the inlet conduit 110. As shown, the collar further includes a hollow cylindrical body 224 having a bore 226 which extends axially between the first end 220 and the second end 222. The body 224 contains an internally threaded portion 230 which is adapted to engage a threaded end of the cooperative coupling member connected to the fluid conduit. An inner surface 234 of the collar second end includes a step portion 236. Particularly, the inner surface 234 of the body 224 has a first section 240 dimensioned to slidingly receive the inlet conduit 110 and a second section 242 which is radially offset from the first section 240 via an abutment wall or shoulder 244. The collar 176 further includes a series of protrusions 250 which are equally spaced around the entire outer surface of the body 224 for ease of handling of the collar.

Figure 2:
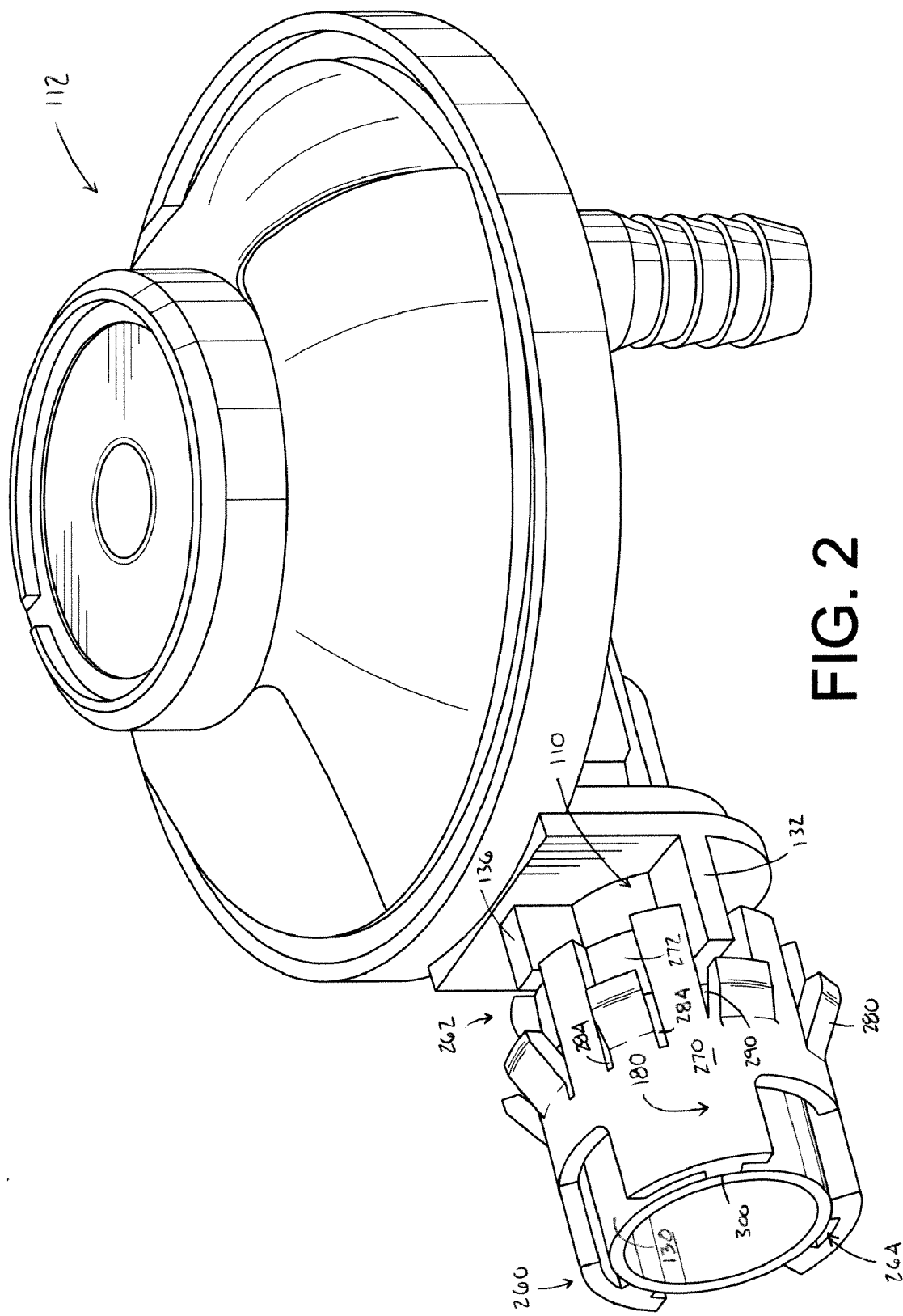
FIG. 2 is a perspective view of the fuel regulator of FIG. 1 with a bushing according to the present disclosure mounted thereto, the bushing being received on an inlet conduit of the fuel regulator.
Figure 3:
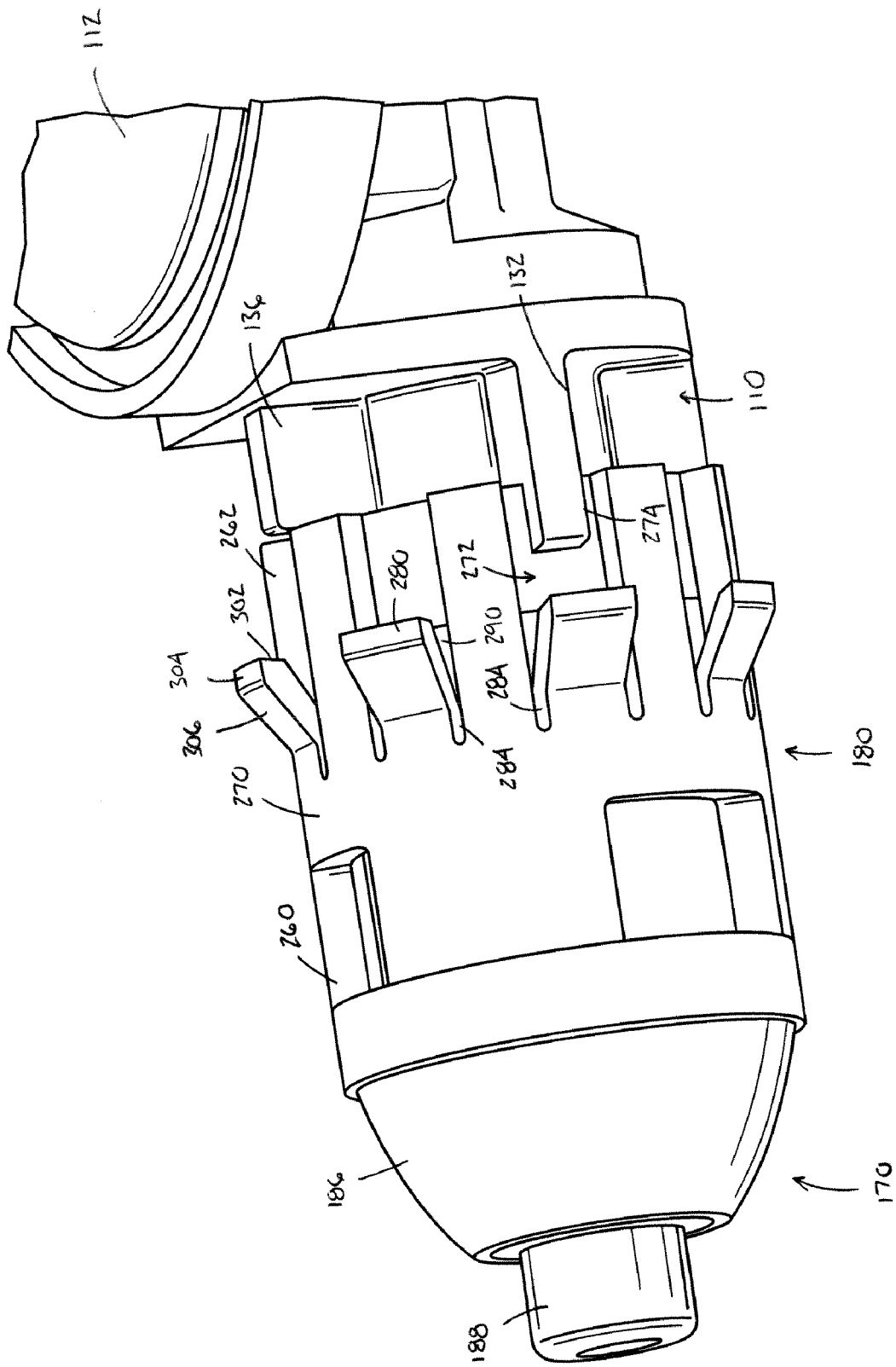
FIG. 3 is an enlarged partial perspective view of the inlet conduit of the fuel regulator of FIG. 2, together with a fluid-carrying member which is at least partially received within the inlet conduit.

As shown in FIGS. 2 and 3, the bushing 180 includes a first end 260, a second end 262 and a central bore 264 extending axially from the first end to the second end. The first end 260 is engaged by the first element 186 of the fluid-carrying member 170 to prevent axial movement of the bushing on the inlet conduit 110. The second end 262 is configured to engage the first ridge 132 of the inlet conduit 110 for preventing rotation of the bushing 180 in relation to the outer surface 130 of the inlet conduit. Particularly, the bushing 180 includes an outer surface 270 and at least one axially extending channel 272 located at the second end 262 of the bushing 180. The channel 272 includes a slot 274 dimensioned to slidingly receive the first ridge of the inlet conduit. In the depicted embodiment, the bushing includes a plurality of circumferentially spaced, axially extending channels 272. Diametrically opposed channels include the slots 274 dimensioned to slidingly receive the pair of diametrically opposed first ridges 132 of the inlet conduit 110. Once the first ridge 132 is positioned within the slot 274 of the channel 272, the bushing is non-rotatably secured to the inlet conduit 110.

The bushing 180 further includes at least one outwardly extending resilient thermally responsive protrusion or finger 280 configured to engage the collar 176 for retaining the collar in place with respect to the inlet conduit 110 while permitting rotational movement of the collar 176 relative to the bushing 180. The protrusion 280 is yieldable in response to a predetermined temperature to permit at least limited axial movement between the collar 176 and the fluid-carrying member 170 to shut off the fluid connection between the fluid-carrying member and the fluid conduit (not shown). The protrusion 280 is separated from the outer surface 270 of the bushing 180 by at least one axially extending slit 284. In the depicted embodiment, the bushing includes a pair of axially extending slits which flank the protrusion, each slit 284 extends through the outer surface 270 of the bushing and into the central bore 264. As shown, the bushing 180 includes a plurality of circumferentially spaced protrusions or fingers 280. Each protrusion is axially spaced inwardly from the second end 262 of the bushing, and is at least partially disposed in one of the plurality of channels 272. Each channel includes an opening 290 which extends into the central bore 264. Each protrusion 280 extends at least partially over the opening thereby allowing the protrusion 280 to be displaced downwardly by the collar 176 during assembly of the fluid coupling 100 to the inlet conduit 110 of the fuel regulator 112. As shown in FIG. 2, the bushing 180 can further includes axially extending ribs 300 which extend inwardly into the central bore 264. The ribs engage the outer surface 130 of the inlet conduit.

With reference to FIG. 4, each protrusion 280 engages the intersecting walls 240 and 242 of the stepped portion 236 of the collar 176. Particularly, each protrusion 280 engages the abutment wall 244 to prevent axial movement between the collar 176 and the fluid-carrying member 170. The protrusion 280 includes a first wall 302 and a second wall 304 which is oriented generally perpendicular to the first wall 302. The first wall 302 engages the abutment wall 244 and the second wall 304 engages the second section 242 of the collar inner surface 234. Further, an outer surface 306 of each protrusion 280 is flared radially outward toward the second end 262. As the collar is being slid axially onto the inlet conduit 110, the inner surface 234 of the collar 176 engages the outer surface 306 of the protrusion 280 and displaces the protrusion downwardly as the collar moves axially over the outer surface of the protrusion and into engagement with the inlet conduit. As the first section 240 of the inner surface 234 moves past the downwardly displaced protrusion 280, the protrusion moves back to its original position to prevent the axial movement between the collar 176 and the fluid-carrying member 170.

With the fluid-carrying member 170, bushing 180, and collar 176 assembled and interlocked as shown in FIG. 4, the cooperative coupling member (not shown) connected to the fluid conduit (not shown) is threadably connected to the freely rotatable collar 176 via the internal threads 230. As this inner connection is tightened, the spring-loaded valve member 210 inside the valve housing 186 and 188 is gradually moved to an open position thereby, against the force of the bias member 214 which normally holds the spring-loaded valve 210 closed. Under normal ambient temperature conditions, the plurality of protrusions 280 resist axial displacement between the collar 176 and the fluid-carrying member 170. As the temperature surrounding the coupling 100 increases, as in the case of a fire, the collar 176 and the components-within it become heated. As this occurs, the plurality of protrusions 280 of the bushing 180 soften. When a predetermined temperature is reached and the protrusions 280 have softened a predetermined amount in response, the softened protrusions will permit at least limited axial movement between the collar 176 and the fluid-carrying member 170 to shut off the fluid connection between the fluid-carrying member 170 and the fluid conduit (not shown). Despite the softening of the protrusions 280, the bushing 180 experiences little overall axial movement on the inlet conduit 110.

As is evident from the foregoing, the method of assembling a thermally responsive fluid coupling 100 of a pressure reducing fuel regulator 112 is provided. The generally annular bushing 180 is positioned over the inlet conduit 110. The bushing includes the plurality of circumferentially spaced fingers or protrusions 280 and the cutout or slot 274 dimensioned to receive the first ridge 132 of the inlet conduit 110. The fluid-carrying member 170 is positioned at least partially within the inlet conduit 110. The collar 176 is positioned over the inlet conduit. The collar includes the first end 220 adapted to be releasably connected to the cooperative fluid coupling and the second end 222. The second end of the collar is secured between the plurality of protrusions 280 of the bushing 180 and the inlet conduit 110 for preventing axial movement between the collar 176 and the fluid-carrying member 170. The first ridge 132 is positioned within the slot 274 to prevent rotation of the bushing 180 on the inlet conduit 110. The plurality of protrusions 280 are displaced downwardly by the second end 222 of the collar 176 as the collar slides over the outer surface 270 of the bushing 180 and is positioned over the inlet conduit 110. The second end 222 of the collar includes the radially extending inner wall 244 which is engaged by the plurality of protrusions 280 in the assembled position. The plurality of protrusions 280 prevent axial movement and the collar 176 and the fluid-carrying member 170.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A thermally responsive fluid coupling for connecting an associated fluid conduit to an associated inlet conduit of an associated fuel regulator, the associated inlet conduit defining a longitudinal axis and having an outer surface including an axially extending ridge, the fluid coupling comprising:
   a fluid-carrying member having an inlet end for receiving fluid from the associated fluid conduit and an outlet end for delivering fluid to the associated inlet conduit;
   a collar disposed around the fluid-carrying member, the collar having a first end adapted to be releasably connected to the associated fluid conduit, and a second end adapted to engage the outer surface of the inlet conduit; and
   a bushing disposed between the fluid-carrying member and the collar, the bushing including a first end, a second end and a central bore extending axially from the first end to the second end, the first end being engaged by the fluid-carrying member, the second end being configured to engage the ridge of the associated inlet conduit for preventing rotation of the bushing in relation thereto, the bushing including an outwardly extending resilient thermally responsive protrusion configured to engage the collar for retaining the collar in place with respect to the associated inlet conduit while permitting rotational movement of the collar relative to bushing, wherein the protrusion is yieldable in response to a predetermined temperature to permit at least limited axial movement between the collar and the fluid-carrying member to shut off the fluid connection between the fluid-carrying member and the associated fluid conduit.

2. The fluid coupling of claim 1, wherein the bushing includes an outer surface and at least one axially extending slit for separating the protrusion from the outer surface of the bushing.

3. The fluid coupling of claim 2, wherein the bushing includes a pair of axially aligned slits which extend through the outer surface of the bushing and into the bore, the protrusion being flanked by the aligned slits.

4. The fluid coupling of claim 1, wherein the bushing includes a plurality of circumferentially spaced protrusions, each protrusion being axially spaced from the second end of the bushing.

5. The fluid coupling of claim 4, wherein the bushing includes a plurality of circumferentially spaced, axially extending channels, each protrusion being at least partially disposed in one of the plurality of channels.

6. The fluid coupling of claim 5, wherein each channel includes an opening extending into the bore, each protrusion extending at least partially over the opening.

7. The fluid coupling of claim 5, wherein at least one channel of the plurality of channels includes a slot dimensioned to slidingly receive the ridge of the inlet conduit.

8. The fluid coupling of claim 1, wherein the collar includes an inner surface having a first section dimensioned to slidingly receive the inlet conduit and a second section radially offset from the first section via an abutment wall, the protrusion engaging the abutment wall to prevent axial movement between the collar and the fluid-carrying member.

9. The fluid coupling of claim 8, wherein the protrusion includes a first wall for engaging the abutment wall and a second wall for engaging the second section of the collar inner surface.

10. The fluid coupling of claim 1, wherein the protrusion is spaced inwardly from the bushing second end, an outer surface of the protrusion being flared radially outwardly toward the second end, the collar displacing the protrusion downwardly as the collar moves axially over the outer surface of the protrusion and into engagement with the inlet conduit.

11. A method of assembling a thermally responsive fluid coupling of a pressure reducing fuel regulator, the fuel regulator including an inlet conduit having a longitudinally extending ridge, the method comprising:
  positioning a generally annular bushing over the inlet conduit, the bushing including a plurality of circumferentially spaced fingers and a cutout dimensioned to receive the ridge of the inlet conduit;
  positioning a fluid-carrying member at least partially within the inlet conduit;
  positioning a collar over the inlet conduit, the collar including a first end adapted to be releasably connected to an associated cooperative fluid coupling and a second end; and
  securing the second end of the collar between the plurality of fingers of the bushing and the inlet conduit for preventing axial movement between the collar and the fluid-carrying member.

12. The method of claim 11, further comprising positioning the ridge of the inlet conduit within the cutout of the bushing to prevent rotation of the bushing on the inlet conduit.

13. The method of claim 11, wherein the inlet conduit includes a pair of diametrically opposed ridges and the bushing includes a pair of corresponding diametrically opposed cutouts, and further comprising positioning the pair of ridges within the pair of cutouts to prevent rotation of the bushing on the inlet conduit.

14. The method of claim 11, further comprising displacing the plurality of fingers downwardly with the second end of the collar as the collar slides over an outer surface of the bushing and is positioned over the inlet conduit.

15. The method of claim 14, wherein the second end of the collar includes a radially extending inner wall, and further comprising engaging the inner wall of the collar with the plurality of fingers.

16. The method of claim 11, further including crimping the fluid-carrying member to the inlet conduit.

17. A method of assembling a thermally responsive fluid coupling of a pressure reducing fuel regulator, the fuel regulator including an inlet conduit having an axially extending ridge, the method comprising:
  sliding a generally annular bushing over the inlet conduit, the bushing including a first end, a second end, a plurality of circumferentially spaced fingers located between the first and second ends and a cutout dimensioned to receive the ridge of the inlet conduit;
  attaching a fluid-carrying member to the inlet conduit, a portion of the fluid-carrying member being at least partially received within the inlet conduit, the fluid-carrying member including a wall for preventing axial movement of the bushing on the inlet conduit;
  sliding a collar over both the bushing and the inlet conduit, the collar including a first end adapted to be releasably connected to an associated cooperative fluid coupling and a second end; and
  securing the second end of the collar between the plurality of fingers of the bushing and the inlet conduit for preventing axial movement between the collar and the fluid-carrying member, an inner surface of the collar second end engaging both the bushing and the fluid conduit.

18. The method of claim 17, further comprising positioning the ridge of the inlet conduit within the cutout of the bushing to prevent rotation of the bushing on the inlet conduit.

19. The method of claim 17, wherein the inner surface of the collar second end includes a stepped portion, and further comprising engaging intersecting walls of the stepped portion with the plurality of fingers.

20. The method of claim 17, further comprising displacing the plurality of fingers downwardly with the second end of the collar as the collar slides over an outer surface of the bushing.

\* \* \* \* \*